Figure 4:
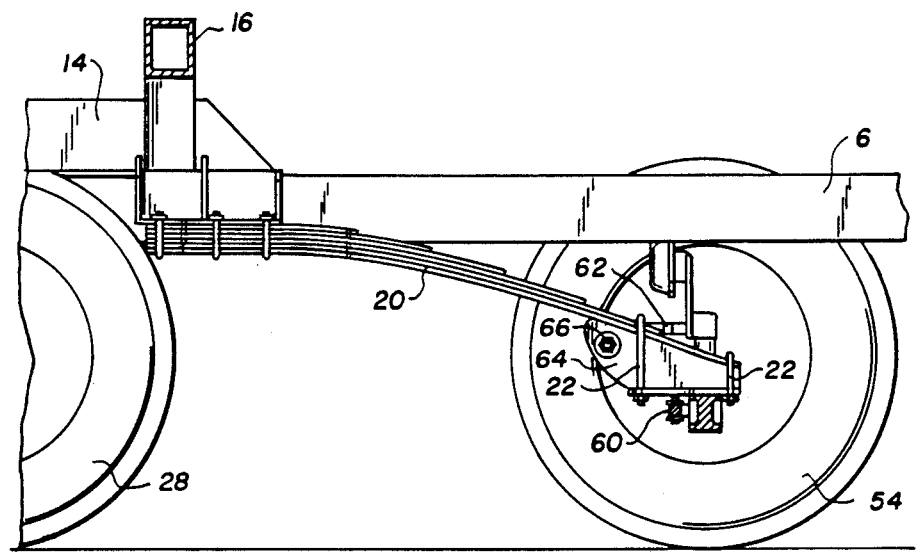

United States Patent [19]

Sjostrom

[11] Patent Number: 4,966,383
[45] Date of Patent: Oct. 30, 1990

[54] LOGGING TRAILER

[76] Inventor: Harold Sjostrom, 4815 Aho Road, R. R. No. 3, Ladysmith, British Columbia V0R 2E0, Canada

[21] Appl. No.: 349,565

[22] Filed: May 9, 1989

[51] Int. Cl.$^5$ .............................................. B60P 3/40
[52] U.S. Cl. .................................. 280/404; 280/81.6; 280/110
[58] Field of Search ...................... 280/401, 404, 81.6, 280/686, 676, 81.1, 680, 704, 718, 86, 109, 110, 122; 180/24.01

[56] References Cited

U.S. PATENT DOCUMENTS 2,359,299  8/1942  Brown ............................. 280/718 X
3,993,326  11/1976  Schmidt ......................... 280/81.6 X Primary Examiner—Charles A. Marmor
Assistant Examiner—Mitchell Bompey
Attorney, Agent, or Firm—Townsend and Townsend

[57] ABSTRACT

An extended trailer to attach to a tractor. The trailer has a main reach able to attach to a tractor. An extension reach extends rearwardly of the main reach. A bridge over the main is rigidly attached to the main reach. There is a forward self steering axle for the extended trailer. Springs extend forward from the bridge to the forward axle. The extension has an intermediate axle and rear axles. A subframe carries the intermediate and rear axles and is pivotally attached to the bridge.

11 Claims, 3 Drawing Sheets

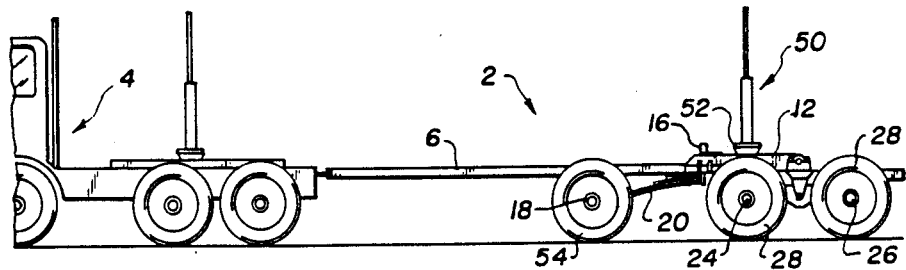
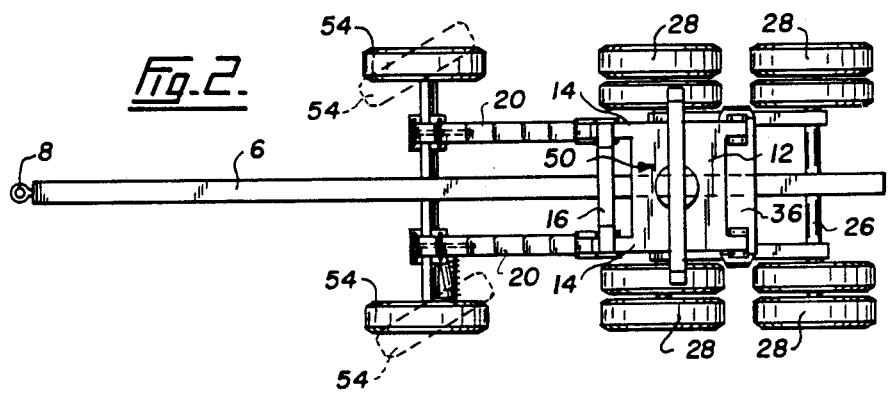
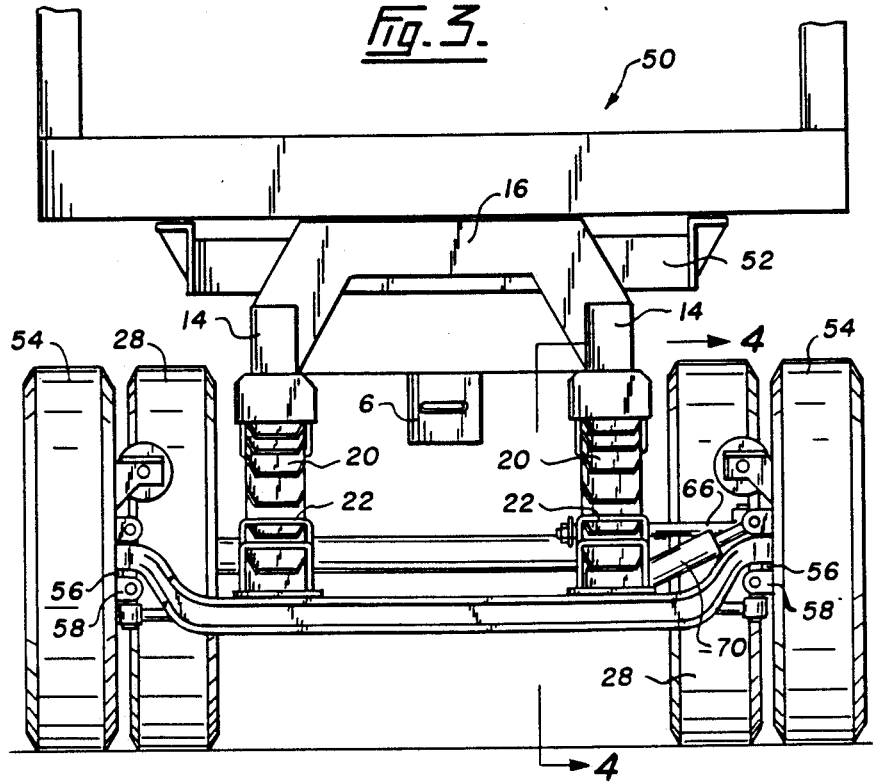

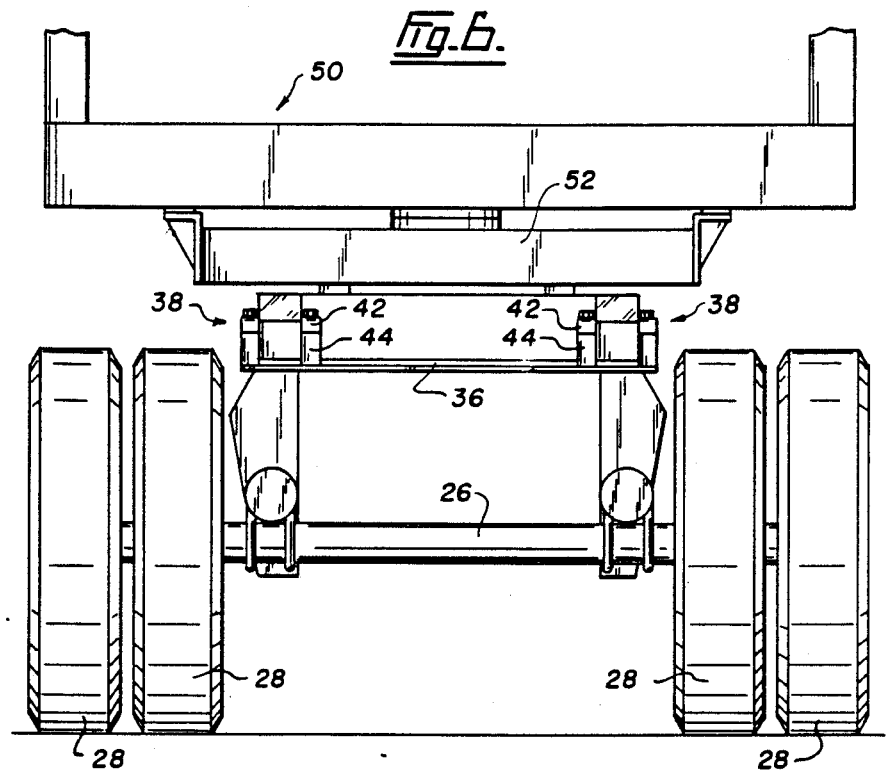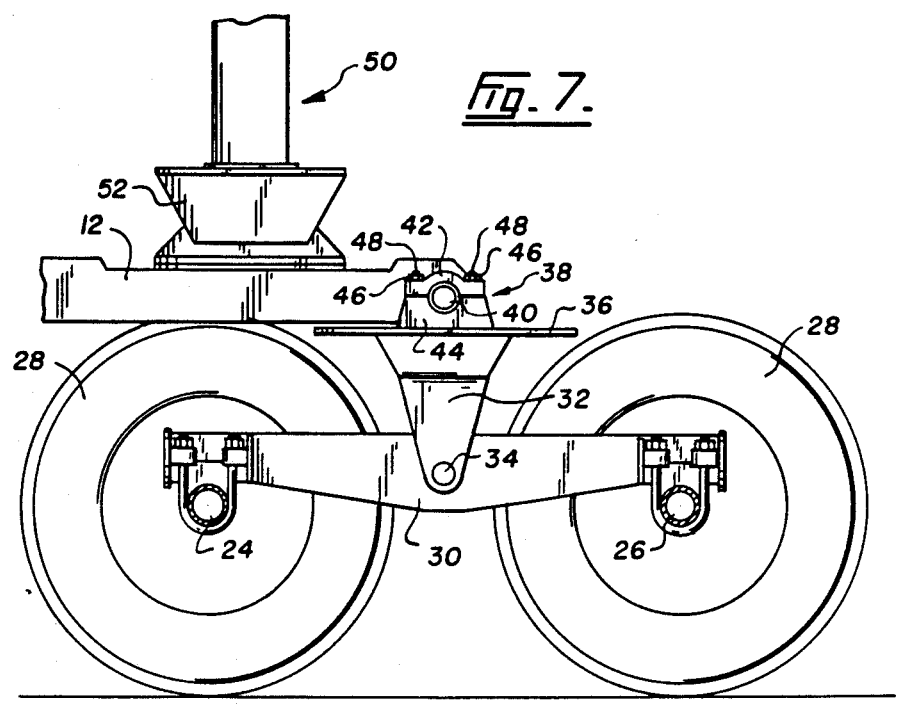

LOGGING TRAILER

FIELD OF THE INVENTION

This invention relates to an extended trailer, especially a trailer for use in logging.

DESCRIPTION OF THE PRIOR ART

In logging a trailer able to carry long loads is required. The typical arrangement used is a tractor trailer combination in which the trailer is of simple construction. The load is, of course, self-supporting. The trailer has a central tubular reach able to attach to the tractor, with two axles at the rear, remote from the tractor. There are upstanding members to restrain the load from sideways movement and these upstanding members typically are mounted on pivotal bunks.

The trailer length is restricted by the small maneuvering capability of a long, simple structure and by highway regulations. These regulations restrict vehicle weight and load-carrying capacity, the latter usually depending on the number of axles, wheels and the spaces between axles.

Examples of prior art structures known to applicant include U.S. Pat. Nos. 4,219,210 to Genberg; 2,034,842 to Stratton; 4,496,166 to Anderson and 2,112,201 to Larison.

Of the above Genberg discloses a logging trailer in which an auxiliary trailer is towed behind a main trailer. The auxiliary trailer has a pivot point that allows it to be carried by the main trailer.

Stratton shows a structure for self-loading the trailers of logging trucks. Anderson relates to a translotor log trailer of complicated structure. Larison again shows a complicated means of loading a trailer onto a truck.

The above demonstrate the complicated structures that are available in logging once the simple, poorly maneuverable, conventional trailer is to be extended.

The present invention seeks to provide a trailer that is longer than conventional trailers and thus of increased load-carrying ability The trailer of the invention is of an improved maneuverability and, in a preferred embodiment, has a leading axle on which the wheels are self-steering.

Accordingly the present invention is an extended trailer to attach to a tractor and comprising:

a main reach;

means formed at the end of the main reach to attach to a tractor;

a bridge extending over the main reach;

a forward self steering axle for the extended trailer;

resilient means extending forward from the bridge to the forward axle;

an intermediate axle on the extension;

a rear axle on the extension; and a subframe carrying the intermediate and rear axles pivotally attached to the bridge.

In a preferred embodiment the invention is a trailer as above in which the forward axle includes steerable mountings for wheels.

In one aspect of this preferred embodiment the trailer has a steering arm extending from one wheel mounting means;

a spring abutment on the axle, spaced from the steering arm; a spring arm extending from the steering arm and slidably received in the spring abutment; a spring received on the steering arm on each side of the spring abutment plate;

whereby the springs allow wheels attached to the forward axle to turn on application of a turning force but urge the wheels back to a straight ahead position in the absence of a turning force.

Aspects of the invention are illustrated, merely by way of example, in the accompanYing drawings in which:

FIG. 1 is a side elevation of a trailer according to the present invention;

FIG. 2 is a plan view of the trailer of FIG. 1;

FIG. 3 is a front elevation of the trailer according to the present invention;

FIG. 4 is a detail on the line 4—4 of FIG. 3;

FIG. 5 illustrates a detail of the preferred embodiment of this invention;

FIG. 6 is an end elevation of the trailer of FIG. 1; and

FIG. 7 is a partial side elevation of the trailer of FIG. 6.

The drawings show an extended trailer 2 to attach to a tractor 4. The trailer comprises a main reach 6 with means formed at the end of the main reach to attach to the tractor 4. A simple hook 8 is shown in FIG. 2; bridge 12 extends over the main reach 6. The bridge 12 comprises longitudinally spaced members 14 linked by cross members 16 although the details of its structure are immaterial. Bridge 12 is rigidly attached to the main reach 6 as shown most clearly in FIG. 4.

There is a forward axle 18 for the extended trailer and resilient means in the form of leaf springs 20, as most clearly shown in FIGS. 3 and 4, extend forwardly from the bridge 12 to the forward axle 18. The leaf springs are located by U-bolts 22 at each end.

There is an intermediate axle 24 on the trailer 2 and a rear axle 26. Both these axles 24 and 26 are provided with wheels 28 at each end. The wheels 28 are freely rotatable on the axles 24 and 26, avoiding the necessity of a differential or the like.

There is a sub-frame to carry the intermediate and rear axles 24 and 26 pivotally attached to the bridge 12. This sub-frame comprises longitudinal members 30 linking the intermediate and rear axles at both sides of the reach 6. There are support members 32 extending from the longitudinal members 30 to the bridge 12. The support members 32 and the longitudinal members 30 are attached at 34. The support members 32 are attached to a mounting plate 36 spaced from bridge 12, typically by about 2 inches. There are bearing blocks 38 attached to the mounting plate 36 to receive pivot pins 40, which are attached to the bridge 12. The bearing blocks 38 comprise upper 42 and lower members 44, the lower members 44 being attached to the upper members 42 by nuts 46 received on studs 48. This is a conventional arrangement. The pivot pins 40 are then received with a bearing fit within the bearing blocks 38.

There are load support means 50 extending from the bridge 12 and, in conventional manner, pivotally attached to a bunk 52 mounted on the bridge 12. The arrangement is most clearly shown in FIGS. 1 and 7 but is not part of the present invention. These load support members 50 and the bunks 52 that permit their rotation are prior art.

In a particularly preferred embodiment of the invention the forward axle 18 includes steerable mountings for wheels 54 mounted on axle 18. The arrangement is such that the wheels 54 are self-steering, rather than being activated by a linkage extending to the driver's cab. In conventional manner the steerable wheels 54 are pivotal on the axle 18 by the use, for example, of steering or king pins 56 extending from housings 58 on the hubs of wheel 54 through a bushing in forward axle 18. There is a steering link 60 extending between the hubs of wheels 54 in conventional manner to ensure that the wheels move in unison about the pivotal steerable mountings 58.

Figure 5:
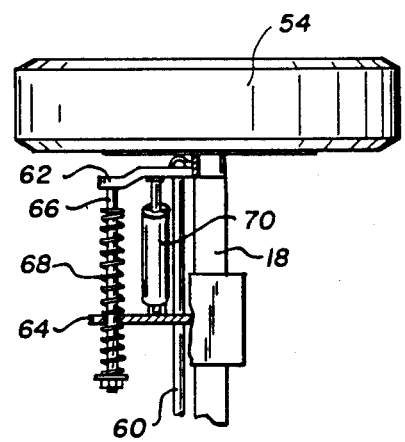

The steering action is controlled by the provision of a steering arm 62 extending from one wheel mounting as shown most clearly in FIGS. 4 and 5. There is a spring abutment 64 on the axle 18, spaced from the steering arm. A spring arm 66 extends from the steering arm 62 and is slidably received in the spring abutment 64. Spring 68 is received on the steering arm 66 on each side of the spring abutment 64. Springs 68 act to damp the wheel movement, acting to prevent the wheels changing steering direction on encountering a bump and also acting to stablilize the wheels in the straight-ahead position when the trailer is not turning.

Wheels 54 are self steering. They have castor and camber so that they can turn as the vehicle turns and thus applies a turning force to the wheels 54. Their mounting is thus designed to allow castor and camber action to steer them as the trailer turns.

A shock absorber or damper 70, preferably hydraulic, extends from the steering arm 62 to damp the action of sppring 68. As shown in FIG. 5 it may be attached to the steering arm 62 at one end and the body or piston of the shock absorber is attached to the spring abutment 64 at its inner end.

The trailer of the present invention permits the carrying of loads of increased length and weight. The provision of pivotal joints and, in particular, the provision of greatly increased wheel area permits greater loads than a conventional trailer. The use of pivotal joints between the bridge and the sub-frame means that the trailer maintains contact with the road at all times.

The trailer is made of conventional materials in the art, bearing in mind that the trailers are subjected to considerable loads and forces.

I claim:

1. An extended trailer to attach to a tractor and comprising:
   a main reach;
   means formed at the end of the main reach to attach to a tractor;
   a bridge extending over the main reach;
   a forward axle for the extended trailer;
   steerable mountings for wheels on the forward axle, the mounting having castor and camber;
   resilient means extending forward from the bridge to the forward axle;
   an intermediate axle on the extension;
   a rear axle on the extension; and
   a subframe carrying the intermediate and rear axles pivotally attached to the bridge.

2. A trailer as claimed in claim 1 in which the bridge member comprises spaced longitudinal members linked by cross members.

3. A trailer as claimed in claim 1 in which the resilient means are leaf springs attached to the bridge and the forward axle.

4. A trailer as claimed in claim 1 in which the subframe comprises longitudinal members linking the intermediate and rear axles at both sides of the extension; and
   support members extending from the longitudinal members to the bridge.

5. A trailer as claimed in claim 4 in which the support members are attached to a mounting plate;
   pivot pins attached to the bridge; and
   bearing blocks attached to the mounting plate whereby the plate can pivot about a transverse axis relative to the bridge.

6. A trailer as claimed in claim 1 including load support means extending from the bridge.

7. A trailer as claimed in claim 6 in which the load support means is pivotally attached to a bunk.

8. A trailer as claimed in claim 1 in which the steerable mountings are pivotal on the axle.

9. A trailer as claimed in claim 8 including steering link extending between the wheel mounting means.

10. A trailer as claimed in claim 9 having a steering arm extending from one wheel mounting means;
    a spring abutment on the axle, spaced from the steering arm;
    a spring arm extending from the steering arm and slidably received in the spring abutment;
    a spring received on the steering arm on each side of the spring abutment plate;
    whereby the spring will allow wheels attached to the forward axle to turn under the action of the castor and camber on application of a turning force but urge the wheels back to a straight ahead position in the absence of a force.

11. A trailer as claimed in claim 10 including a shock absorber extending from the steering arm to damp the spring action.

* * * * *